(12) United States Patent
Wang et al.

(10) Patent No.: US 7,659,352 B2
(45) Date of Patent: Feb. 9, 2010

(54) ANTIREFLECTIVE COATING COMPOSITION, ANTIREFLECTION FILM, AND FABRICATION METHOD THEREOF

(75) Inventors: Wu-Jing Wang, Hsinchu (TW); Yen-Po Wang, Taipei (TW); Yun-Ching Lee, Hualien County (TW); Joung-Yei Chen, Taipei County (TW); Hsi-Hsin Shih, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 677 days.

(21) Appl. No.: 11/221,914

(22) Filed: Sep. 9, 2005

(65) Prior Publication Data

US 2006/0099407 A1    May 11, 2006

(30) Foreign Application Priority Data

Nov. 11, 2004    (TW) .............................. 93134444 A (51) Int. Cl.
   *C08F 30/08*    (2006.01)
(52) U.S. Cl. ........................................ 526/279; 528/41
(58) Field of Classification Search .................. 526/279; 528/41
See application file for complete search history.

(56) References Cited

U.S. PATENT DOCUMENTS 6,210,858 B1 *  4/2001  Yasuda et al. ............ 430/270.1

FOREIGN PATENT DOCUMENTS

| JP | 7-286126 A | 10/1995 |
|---|---|---|
| JP | 11-6902 A | 1/1999 |
| JP | 2000-75105 A | 3/2000 |
| JP | 2002-79600 A | 3/2002 |
| JP | 2004-212791 A | 7/2004 |
| JP | 2004-300172 A | 10/2004 |
| JP | 2005-15581 A | 1/2005 |
| WO | WO-2005/012955 A2 | 2/2005 |

* cited by examiner

*Primary Examiner*—Kuo-Liang Peng
(74) *Attorney, Agent, or Firm*—Birch, Stewart, Kolasch & Birch, LLP (57) ABSTRACT

An antireflective coating composition, antireflection films and fabrication method thereof. The antireflection film is constructed by stacked crosslink colloid particles, having a plurality of nanopores distributed uniformly therein. Due to the nanopores, the antireflection film has a refractive index less than 1.45, reducing the reflectivity of less than 3.0%. Furthermore, since the antireflection film comprises crosslink oxide colloid, the film exhibits superior mechanical strength and is suitable for use in display devices.

27 Claims, 4 Drawing Sheets

ANTIREFLECTIVE COATING COMPOSITION, ANTIREFLECTION FILM, AND FABRICATION METHOD THEREOF

BACKGROUND

The present invention relates to an antireflection film and fabrication method thereof, and more particularly to an antireflection film with superior mechanical strength and low reflectivity.

Antireflection film is generally disposed on an outermost surface of an image display device such as optical lens, cathode ray tube display device (CRT), plasma display panel (PDP), liquid crystal display device (LCD), or organic electroluminescent device, to reduce reflectance so as to prevent optical interference from external light.

Single-layer antireflection film provides high yield, simple fabrication process, and low cost, making it a popular display industry choice. Antireflection film of conventional organic compounds containing fluorine used in multi-layer antireflection films, such as $CaF_2$, or $MgF_2$, cannot, however, achieve sufficiently high scratch resistance due to the poor cohesion of fluorine-containing compounds. Thus, a hard coat layer is formed thereon. Furthermore, the antireflection film made thereby has a sufficient refractive index of only 520 to 570 nm, and refractive index thereof cannot be further reduced to 1.40 or less.

Figure 1:
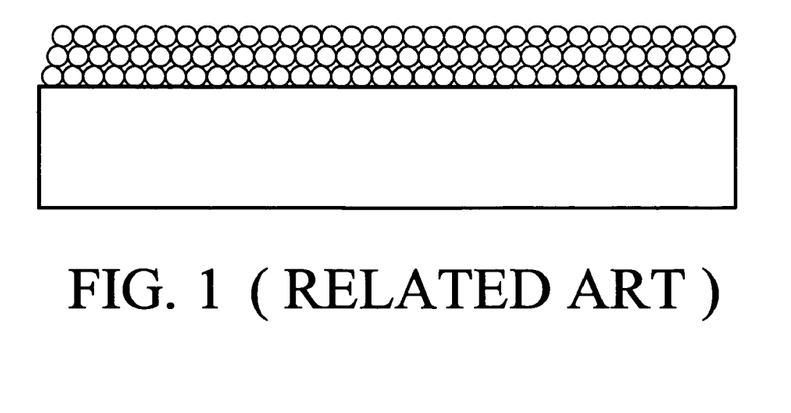
FIG. 1 is a schematic diagram of a conventional antireflection film of colloid silica.

A conventional antireflection film with a plurality of nanopores has been disclosed to reduce the refractive index thereof, and FIG. 1 is a schematic view showing the profiles of the antireflection film. Since conventional antireflection film is constructed from stacked silica colloid particles, a plurality of pores occurs among the particles, further lowering reflectance. Accordingly, the conventional antireflection film has a high volume ratio of pores, with mechanical strength thereof depending on the interaction between silica colloid particles. The stacked silica colloid particles, however, are stabilized by intramolecular interaction (van der Waals force) thereof. The conventional antireflection film has low mechanical strength resulting in inferior hardness and scratch resistance thereof, failing to meet the demands of the flat display panel industry.

Therefore, it is necessary to develop an antireflection film with low refractive index and high mechanical strength.

SUMMARY

The invention provides an antireflective coating composition, comprising an initiator and a polymerizable oxide-containing colloid as a uniform solution in an organic solvent. Particularly, the polymerizable oxide-containing colloid comprises condensation products derived from (i) colloid particles with a formula (I):

$$Z_xO_y, \quad (I)$$

and (ii) a compound with polymerizable groups having a formula (II):

$$_n(R^1)\text{—M}(OR^2)_m \quad (II)$$

Accordingly, Z is an element of Group IIIB, Group IVB, or Group VB, W, Be, Ti, Zr, or Zn. x and y are integers equal to or more than 1. $R^1$ is alkenyl group, acrylic group, acryloyl group, epoxy group, or isocyanato group. $R^2$ is alkyl group or haloalkyl group. M is Si, Al, Ti, Zr, Sn, or Sb. n and m are integers equal to or more than 1. The weight ratio between (i) the colloid particles and (ii) the compound with polymerizable groups is 10:1~1:10.

Methods for fabricating antireflection film of the aforementioned antireflective coating composition are provided, in which a coating of the antireflective coating composition is formed on a substrate. The coating is cured, polymerizing the antireflective coating composition and forming an antireflection film.

Embodiments of the invention further provide a method for fabricating antireflection film comprising the following steps. A coating of an antireflective coating composition is formed on a substrate, the antireflective coating composition comprising the following components as a uniform solution in a first organic solvent: an initiator in an amount of 1 to 10 parts by weight; a template in an amount of 5 to 55 parts by weight; and a polymerizable oxide-containing colloid in an amount of 45 to 95 parts by weight, based on 100 parts by weight of the polymerizable oxide-containing colloid and the template. The coating is cured, and the antireflective coating composition is polymerized to form a dry film. A second organic solvent dissolves the template from the dry film, leaving an antireflection film with nanopores.

The obtained antireflection film, with a thickness of 50~500 nm, exhibits refractive index less than 1.45, a reflectivity less than 3.0%, a transparency of more than 93%, a haze of 0.1~15%, and a pencil hardness exceeding F. The antireflection film can be disposed on an outermost surface of an image display device such as an optical lens, a cathode ray tube display device (CRT), a plasma display panel (PDP), a liquid crystal display device (LCD), or an organic electroluminescent device, to reduce reflectance so as to prevent optical interference caused by external light.

A detailed description is given in the following with reference to the accompanying drawing.

BRIEF DESCRIPTION OF THE DRAWINGS

The invention can be more fully understood by reading the subsequent detailed description in conjunction with the examples and references made to the accompanying drawings, wherein.

DETAILED DESCRIPTION

An antireflective coating composition of the invention comprises an initiator and a polymerizable oxide-containing colloid, as a single liquid phase in an organic solvent. The initiator is in an amount of 0.1~10 parts by weight, based on 100 parts by weight of the polymerizable oxide-containing colloid.

The initiator can be a photo initiator or a thermal initiator, such as peroxide or azo initiator, which generates, upon activation, free radical species through decomposition, and can be 2,2'-azobis(2-cyano-2-butane), dimethyl 2,2'-azobis(methylisobutyrate), 4,4'-azobis(4-cyanopentanoic acid), 4,4'-azobis(4-cyanopentan-1-ol), 2,2'-azobis(2-methylpropane), dilauroyl peroxide, tertiary amyl peroxides, tertiary amyl peroxydicarbonates, t-butyl peroxyacetate, t-butyl peroxybenzoate, t-butyl peroxyoctoate, t-butyl peroxyneodecanoate, dicumyl peroxide, dibenzoyl peroxide, potassium peroxydisulfate, ammonium peroxydisulfate, di-tert butyl peroxide, di-t-butyl hyponitrite, dicumyl hyponitrite, or combinations thereof.

The polymerizable oxide-containing colloid comprises condensation products derived from (i) colloid particles with a formula (I):

$$Z_xO_y, \quad (I)$$

and (ii) a compound with polymerizable groups having a formula (II):

$$_n(R^1)-M(OR^2)_m \quad (II)$$

Accordingly, Z is element of Group IIIB, Group IVB, Group VB, or W, Be, Ti, Zr, or Zn. x and y are integers equal to or more than 1. $R^1$ is alkenyl group, acrylic group, acryloyl group, epoxy group, or isocyanato group. $R^2$ is alkyl group or haloalkyl group. M is Si, Al, Ti, Zr, Sn, or Sb. n and m are integers equal to or more than 1. The weight ratio between (i) the colloid particles and (ii) the compound with polymerizable groups is 10:1~1:10, preferably 1:1~1:5. Herein, the polymerizable group can comprise alkenyl group, acrylic group, acryloyl group, epoxy group, or isocyanato group. The colloid particle can comprises $WO_3$, $ZnO$, $SiO_2$, $Al_2O_3$, $TiO_2$, $ZrO_2$, $SnO_2$, $BeO$, $Sb_2O_5$, or combinations thereof, with a diameter of 5~150 nm. The compound with polymerizable groups can comprise 3-methacrylicoxy propyl trimethoxy silane (MPTS), glycidoxy triethoxysilane, 3-thiocyanatopropyl triethoxy silane, 3-amino-propyltriethoxysilane, glycidyloxypropyl triethoxy silane, vinyl triethoxy silane (VTES), vinyl trimethoxy silane, or combinations thereof. In some embodiments of the invention, the polymerizable oxide-containing colloid can comprise a mixture or product of a fluorine-containing polymerizable monomer and condensation products derived from (i) colloid particles with a formula (I), and (ii) a compound with polymerizable groups having a formula (II). The colloid particles, the compound with polymerizable groups, and the fluorine-containing polymerizable monomer are respectively in an amount of 10~70 parts by weight, 10 to 40 parts by weight, and 20 to 50 parts by weight, based on 100 parts by weight of the colloid particles, the compound with polymerizable groups, and the fluorine-containing polymerizable monomer. The fluorine-containing polymerizable monomer can comprise 2,2,2 trifluoroethyl aclylate, 2,2,2 trifluoroethyl methacrylic, hexafluoroisopropyl acrylic, hexafluoroisopropyl methacrylic, 2,2,3,3,3-pentafluoropropyl acrylate, 2,2,3,3,3-pentafluoropropyl methacrylate, 2,2,3,3,4,4,4-heptafluorobutyl acrylate, 2,2,3,3,4,4,4-heptafluorobutyl methacrylate, 2,2,3,3-tetrafluoropropyl acrylate, 2,2,3,3-tetrafluoropropyl methacrylate, 2,2,3,4,4,4-hexafluorobutyl acrylate, 2,2,3,3,3-pentafluoropropyl methacrylate, 2,2,3,3,4,4,4-heptafluorobutyl methacrylate, 2,2,3,3-tetrafluoropropyl methacrylate, 2,2,3,4,4,4-hexafluorobutyl methacrylate, or combinations thereof.

In an embodiment of the invention, the antireflective coating composition can further comprise a template, with a weight ratio between the template and the polymerizable oxide-containing colloid 45:55~55:95, to increase pore volume ratio and reduce reflectivity thereof. The template comprises non-reactive organic compound, non-reactive oligomer, non-reactive polymer, or combinations thereof. Herein, the organic solvent of the antireflective coating composition dissolves the polymerizable oxide-containing colloid and template simultaneously.

Further, the antireflective coating composition can further comprise a polymerizable monomer and/or an additive. The polymerizable monomer can be acrylic resin, epoxy resin, polyurethane resin, or combinations thereof, such as methyl acrylate, ethyl acrylate, isooctyl acrylate, methyl methacrylate, pentaerythritol triacrylate, 2-hydroxyl-ethyl acrylate, 2-hydroxyl-ethyl methylacrylate, 2-hydroxy propylacrylate, acrylamide, 1,6-hexanediol diacrylate, ethyleneglycol diacrylate, pentaerythritol tetraacrylate, ethoxylated pentaerythritol tetraacrylate, triethyleneglycol diacrylate, tripropyleneglycol diacrylate, neopentylglycol diacrylate, trimethylolpropane triacrylate, trimethylolpropane trimethacrylate, trimethylolpropane pentaerythritol triacrylate or combinations thereof, with the weight ratio between the polymerizable monomer and the polymerizable oxide-containing colloid 10:1 to 1:10. Optionally, at least one hydrogen atom bonded to the carbon atom of the polymerizable monomer can be substituted by a fluorine atom. The additive can comprise planarization reagent, leveling agent, tackifier, filler, defoamer, or combinations thereof. The weight ratio between the additive and the polymerizable oxide-containing colloid is 1:99~1:1.

Figure 2:
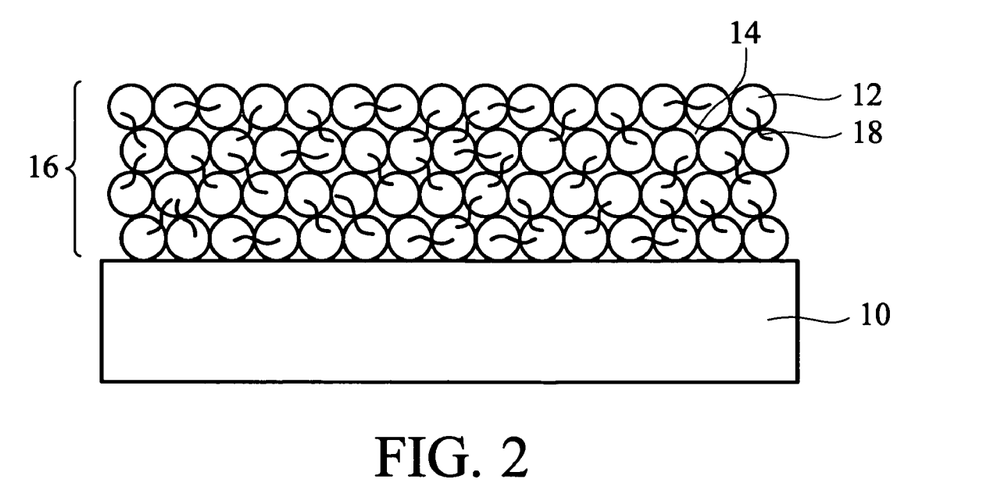
FIG. 2 is a cross section of an antireflection film with nanopores according to an embodiment of the invention.

In a method for fabricating antireflection film with nanopores, a substrate with a surface is provided. The substrate can be a transparent substrate, such as a glass, plastic, or ceramic substrate. Next, a coating of the antireflective coating composition is formed on the surface of the substrate. The antireflective coating composition comprises the initiator and the polymerizable oxide-containing colloid as described above. The coating is cured to form an antireflection film by heating or exposure to an actinic ray, through polymerization of the antireflective coating composition. FIG. 2 shows a cross section of the antireflection film 16 with nanopores 14 disposed on the substrate 10. Particularly, the stacked polymerizable oxide-containing colloids 12 are linked each other by chemical bonds 18, resulting from the polymerization of the polymerizable groups thereof.

Figure 3A:
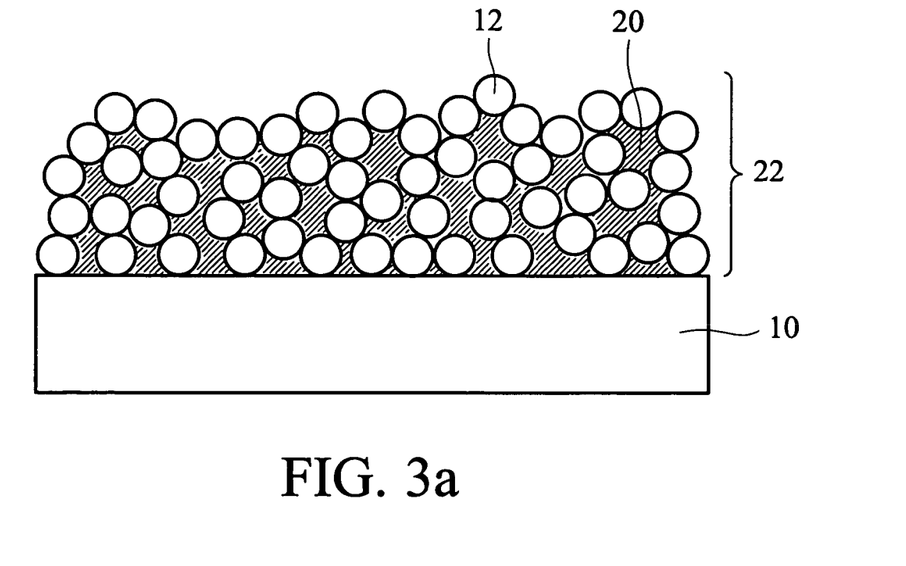
FIGS. 3a and 3b are cross-sections showing a method of fabricating an antireflection film with nanopores according to an embodiment of the invention.
Figure 3B:
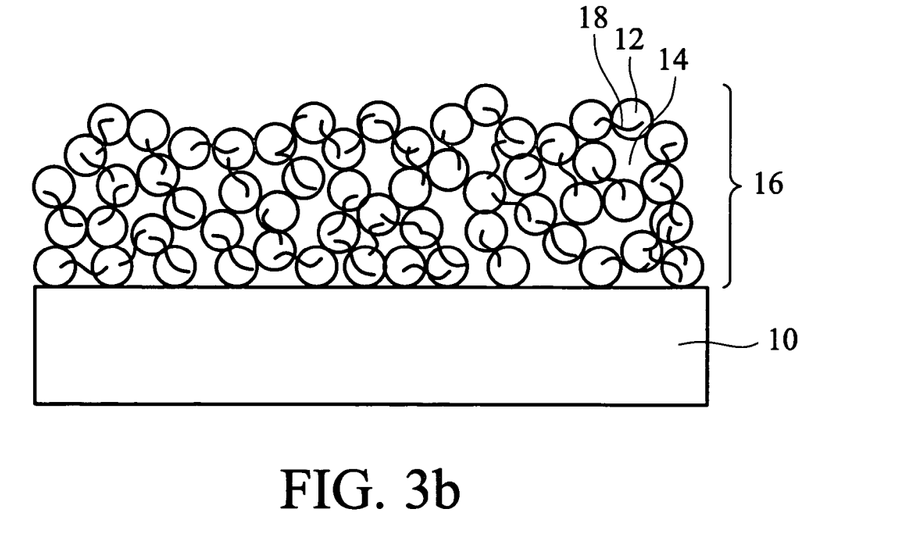

In a method for fabricating antireflection film employing the antireflective coating composition comprising templates, a coating of the antireflective coating composition is formed on a substrate. The antireflective coating composition as a uniform solution in a first organic solvent comprises the initiator in an amount of 0.1~10 parts by weight, the template in an amount of 5~55 parts by weight, and the polymerizable oxide-containing colloid in an amount of 45~95 parts by weight, based on 100 parts by weight of the polymerizable oxide-containing colloid and the template. Referring to FIG. 3a, in the coating 22, particles of the template 20 are mixed uniformly with the polymerizable oxide-containing colloid 12. The coating is cured to crosslink the polymerizable oxide-containing colloid 12 through the formation of chemical bonds 18 therebetween, resulting in a dry film. Next, a second organic solvent dissolves the template 20 from the dry film, leaving an antireflection film 16 with nanopores 14, referring to FIG. 3b. It should be noted that the second organic solvent dissolves the template dispersed over the dry film, leaving the antireflection film. The antireflection film can be 50~500 nm thick, preferably 50~300 nm thick, and the diameter of the nanopores can be 1~100 nm, preferably 5~80 nm.

Distribution and volume ratio of the nanopores are controlled by modifying the weight ratio between the template and the polymerizable oxide-containing colloid, to maintain dispersion of the template over the dry film under polymerization of the polymerizable oxide-containing colloid rather than combination. Consisting essentially of crosslink oxide-containing colloid, the antireflection film exhibits a superior mechanical strength and scratch resistance despite nanopore volume ratio exceeding 40%. The nanopores of the antireflection film are sufficiently filled by air, and the antireflection film exhibits refractive index less than 1.45, a reflectivity less than 3.0%, a transparency of more than 93%, a haze of 0.1~15%, and a pencil hardness exceeding F.

According to the invention, the method for fabricating antireflection film further comprises forming a protective layer on the antireflection film. The protective layer can be a hard coating used in display technology. Preferably, the protective layer comprises the condensation products of a compound with polymerizable groups having a formula (II):

$$_n(R^1)\text{---}M(OR^2)_m, \quad (II)$$

and a compound having a formula (III):

$$_i(R^2)\text{---}M(OR^2)_j$$

Accordingly, $R^1$ is alkenyl group, acrylic group, acryloyl group, epoxy group, or isocyanato group. $R^2$ is alkyl group or haloalkyl group. M is the same or different and Si, Al, Ti, Zr, Sn, or Sb. n and m are integers equal to or more than 1. i is an integer equal to or more than 0, and j an integer equal to or more than 1. The sum of i and j is an integer equal to or more than 2. The compound having a formula (III) can be tetramethoxysilane (TMOS), tetraethoxysilane (TEOS), methyl triethoxysilane (MTES), dimethyl dimethoxysilane, ethyl triethoxysilane, tetrapropoxysilane (TPOS), tetrabutoxysilane (TBOS), or combinations thereof.

The following examples are intended to demonstrate this invention more fully without limiting its scope, since numerous modifications and variations will be apparent to those skilled in the art.

Preparation of Polymerizable Oxide-Containing Colloid

Example 1

60 g of 3-methacrylicoxy-propyl trimethoxy silane (MPTS) and 140 g colloid silica (sold and manufactured under the trade number of MAST by Nissan Chemical Co., Ltd) with a diameter of 12 nm were dissolved in 1000 g H₂O/ethanol (H₂O:ethanol=1:1). After stirring for 4 hr at 70° C., a polymerizable colloid silica A was obtained. The reaction according to Example 1 is shown below.

polymerizable colloid silica A

Example 2

Example 2 was performed as Example 1 except for substitution of 80 g MPTS and 120 g colloid silica for 60 g MPTS and 140 g colloid silica, and a polymerizable colloid silica B was obtained. Particularly, the weight ratio between MPTS and colloid silica was 4:6.

Example 3

Example 3 was performed as Example 1 except for substitution of 100 g MPTS and 100 g colloid silica for 60 g MPTS and 140 g colloid silica, and a polymerizable colloid silica C was obtained. Particularly, the weight ratio between MPTS and colloid silica was 1:1.

Example 4

Example 4 was performed as Example 1 except for substitution of 120 g MPTS and 80 g colloid silica for 60 g MPTS and 140 g colloid silica, and a polymerizable colloid silica D was obtained. Particularly, the weight ratio between MPTS and colloid silica was 6:4.

Example 5

Example 5 was performed as Example 1 except for substitution of 140 g MPTS and 60 g colloid silica for 60 g MPTS and 140 g colloid silica, and a polymerizable colloid silica E was obtained. Particularly, the weight ratio between MPTS and colloid silica was 7:3.

Example 6

60 g of tetraethoxysilane (TEOS), 40 g colloid silica (sold and manufactured under the trade number of MAST by Nissan Chemical Co., Ltd) with a diameter of 12 nm, 0.4 g HCl, and 5 g 3-methacrylicoxy-propyl trimethoxy silane (MPTS) were dissolved in 1500 g ethanol and 250 g H2O. After stirring for 4 hr at 78° C., a polymerizable colloid silica F was obtained.

Example 7

60 g of polymerizable colloid silica A provided by Example 1, 140 g 2,2,2-trifluoroethyl acrylate, 0.75 g benzoyl peroxide (BPO) were dissolved in 100 ml THF. After stirring for 4 hr at 60° C., a polymerizable colloid silica G was obtained. The reaction according to Example 7 is shown below.

polymerizable colloid silica A     2, 2, 2-trifluoroethyl acrylate -continued polymerizable colloid silica G

Example 8

Example 8 was performed as Example 7 except for substitution of 80 g polymerizable colloid silica A and 120 g 2,2,2-trifluoroethyl acrylate for 60 g polymerizable colloid silica A and 140 g 2,2,2-trifluoroethyl acrylate, and a polymerizable colloid silica H was obtained.

Example 9

Example 9 was performed as Example 7 except for substitution of 100 g polymerizable colloid silica A and 100 g 2,2,2-trifluoroethyl acrylate for 60 g polymerizable colloid silica A and 140 g 2,2,2-trifluoroethyl acrylate, and a polymerizable colloid silica I was obtained.

Example 10

Example 10 was performed as Example 7 except for substitution of 120 g polymerizable colloid silica A and 80 g 2,2,2-trifluoroethyl acrylate for 60 g polymerizable colloid silica A and 140 g 2,2,2-trifluoroethyl acrylate, and a polymerizable colloid silica J was obtained.

Example 11

Example 11 was performed as Example 7 except for substitution of 140 g polymerizable colloid silica A and 60 g 2,2,2-trifluoroethyl acrylate for 60 g polymerizable colloid silica A and 140 g 2,2,2-trifluoroethyl acrylate, and a polymerizable colloid silica K was obtained.

Preparation of Antireflective Coating Compositions

Example 12

10 g of polymerizable colloid silica A provided by Example 1, and 0.02 g triphenyl triflate were dissolved in 30 ml THF. After stirring completely, an antireflective coating composition A was obtained.

Example 13

10 g of polymerizable colloid silica G provided by Example 7, and 0.02 g triphenyl triflate were dissolved in 56.6 ml THF. After stirring completely, an antireflective coating composition B was obtained.

Example 14

100 g of polymerizable colloid silica A provided by Example 1, 6.6 g nematic liquid crystal (sold and manufactured under the trade number of E7 by Merck Co., Ltd) as a template, and 0.02 g triphenyl triflate were dissolved in 425 ml THF. After stirring completely, an antireflective coating composition C was obtained.

Example 14

100 g of polymerizable colloid silica A provided by Example 1, 6.6 g nematic liquid crystal (sold and manufactured under the trade number of E7 by Merck Co., Ltd) as a template, and 0.02 g triphenyl triflate were dissolved in 425 ml THF. After stirring completely, an antireflective coating composition C was obtained.

Example 15

100 g of polymerizable colloid silica A provided by Example 1, 6.6 g poly-ethylene glycol (PEG) as a template, and 0.02 g triphenyl triflate were dissolved in 425 ml THF. After stirring completely, an antireflective coating composition D was obtained.

Example 16

7 g of polymerizable colloid silica G provided by Example 7, 3 g pentaerythritol triacrylate, and 0.033 g triphenyl triflate were dissolved in 56.6 ml THF. After stirring completely, an antireflective coating composition E was obtained.

Example 17

5 g of polymerizable colloid silica A provided by Example 1, 1 g pentaerythritol triacrylate, and 0.02 g triphenyl triflate were dissolved in 30 ml THF. After stirring completely, an antireflective coating composition F was obtained.

Example 18

5 g of polymerizable colloid silica F provided by Example 6, and 0.02 g triphenyl triflate were dissolved in 3.5 ml ethanol. After stirring completely, an antireflective coating composition G was obtained.

Comparative Example 1

100 g of colloid silica (sold and manufactured under the trade number of MAST by Nissan Chemical Co., Ltd) was dissolved in 600 ml THF. After stirring completely, an antireflective coating composition H was obtained.

Preparation of Antireflection Films

Example 19

The antireflective coating composition A was coated on a glass substrate having a hard coating with a refractive index of 1.69 by spin coating at a speed of 2500 rpm for 30 sec. Next, the substrate was baked at 60° C. for 3 min and exposed to a UV ray, and an antireflection film A, with a thickness of 150 nm, was formed by polymerization of the antireflective coating composition A.

Figure 4:
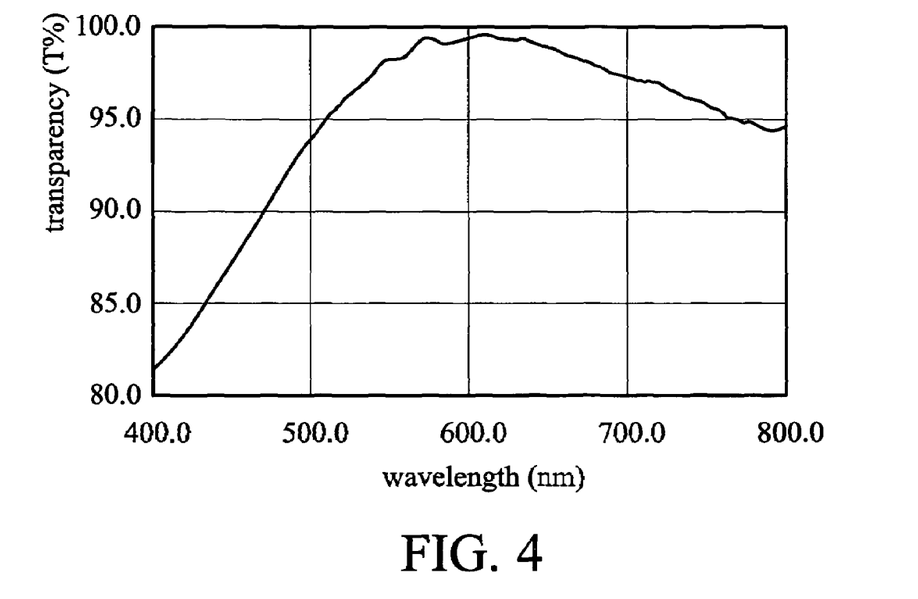
FIG. 4 is a graph plotting transparency against wavelength of the antireflection film according to Example 20.
Figure 5:
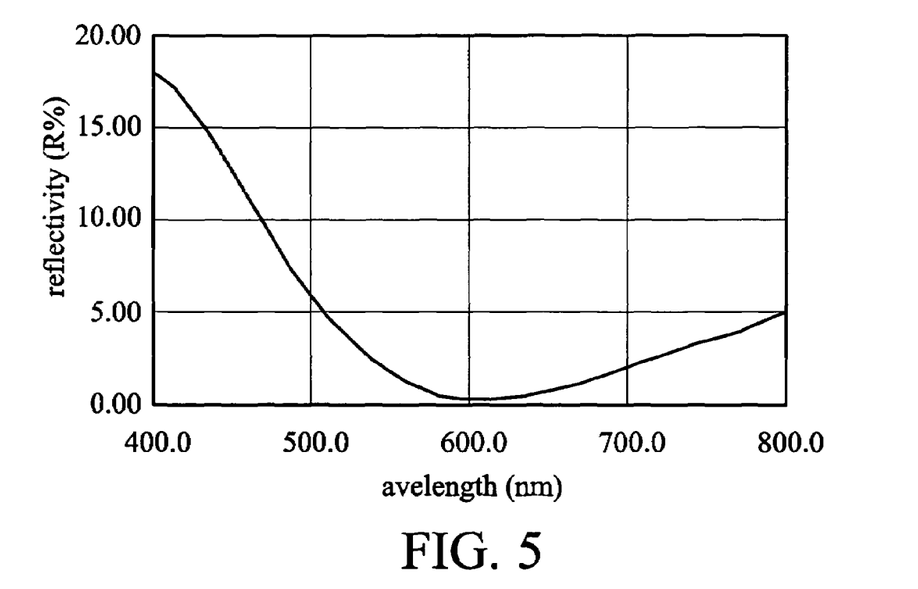
FIG. 5 is a graph plotting reflectivity against wavelength of the antireflection film according to Example 20.

Afterward, the reflectivity and transparency of the antireflection film A were measured at a measured wavelength of 400~700 nm, as shown in FIGS. 4 and 5.

Example 20

The antireflective coating composition C was coated on a glass substrate having a hard coating with a refractive index of 1.69 by spin coating at a speed of 2500 rpm for 30 sec. Next, the substrate was baked at 60° C. for 3 min and exposed to a UV ray, and a dry film A was formed by polymerization of the antireflective coating composition C. Next, the dry film was immersed in acetone to dissolve the nematic liquid crystal, leaving an antireflection film B with a thickness of 100 nm.

Example 21

3-methacrylicoxy propyl trimethoxy silane (MPTS), tetramethoxy silane (TMOS), hydrochloric acid (HCl), and de-ion water (H2O) were put into a bottle and dissolved in ethanol at 60° C., with mole ratio of MPTS, TMOS, HCl, H2O, and ethanol is 0.25/0.75/0.1/4/15. After stirring for 3 hr, a hard coating composition A was obtained.

Next, the hard coating composition A was coated on the antireflection film B provided by Example 20. After heating at 120° C. for 3 hr, an antireflection film C, comprising the antireflection film B with a protective layer (10 nm) formed thereon, was obtained.

Example 22

The antireflective coating composition B was coated on a glass substrate having a hard coating with a refractive index of 1.69 by spin coating at a speed of 2500 rpm for 30 sec. Next, the substrate was baked at 60° C. for 3 min and exposed to a UV ray. After heating at 80° C. for 30 min, an antireflection film D, with a thickness of 100 nm, was formed.

Example 23

Figure 6:
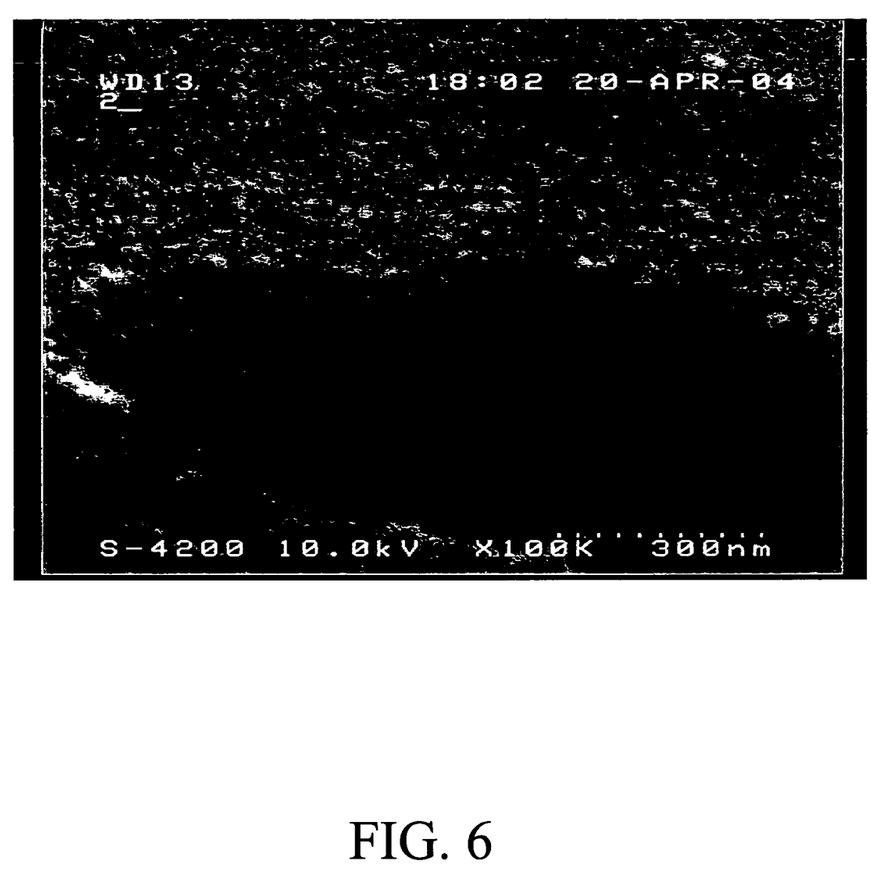
FIG. 6 is a SEM photograph of the antireflection film according to Example 24.

The antireflective coating composition G was coated on a glass substrate having a hard coating with a refractive index of 1.69 by spin coating at a speed of 2500 rpm for 30 sec. Next, the substrate was baked at 60° C. for 3 min and exposed to a UV ray. After heating at 80° C. for 30 min, an antireflection film E with a thickness of 100 nm was formed, and the profile thereof was identified by scanning electron microscopy (SEM) as shown in FIG. 6.

Example 24

30 g tetraethoxysilane (TEOS), colloid silica (sold and manufactured under the trade number of Snowtex-UP by Nissan Chemical Co., Ltd) with a diameter of 40~100 nm, and 0.4 g HCl were dissolved in 500 g ethanol and 250 g H2O. After stirring for 4 hr at 78° C., 3.0 g poly-ethylene glycol (PEG) was added into the mixture, preparing an antireflective coating composition.

The antireflective coating composition was coated on a glass substrate having a hard coating with a refractive index of 1.69 by spin coating at a speed of 2500 rpm for 30 sec. Next, the substrate was baked at 60° C. for 3 min and exposed to a UV ray. After heating at 80° C. for 30 min, a dry film was formed. Next, the dry film was immersed in acetone to dissolve the nematic liquid crystal, leaving an antireflection film F with a thickness of 100 nm.

COMPARATIVE Example 2

The antireflective coating composition H provided by Comparative Example 1 was coated on a glass substrate having a hard coating with a refractive index of 1.69 by spin coating at a speed of 2500 rpm for 30 sec. Next, the substrate was baked at 60° C. for 3 min, and an antireflection film G with a thickness of 150 nm was formed.

The hardness, adhesion, solvent-resistance, and haze of antireflection films B-G were measured. The surface hardness of the nanoporous film was measured through a pencil hardness test conforming to Japan Industrial Standard (JIS) K5600. The adhesion between the substrate and the nanoprous film was estimated by means of the cross-cut test conforming to JIS-K6801 (the symbol "⊚" indicates that all the films remained totally on the substrate; "X" indicates that at least one film was peeled off). The solvent resistance was estimated by dripping ethanol on the nanoporous film, and the change in appearance was observed (the symbol "⊚" indicates that the films were completely unscathed; the symbol "X" indicates that the film was damaged or eroded by ethanol). The haze of the nanoporous film was measured by hazemeter (MODEL TC-HIII, a product of TOKYO DENSYOKU Co., Ltd). The refractive index and reflectivity of the antireflection films were measured by MPC-3100 and UV-3150 spectrophotometer (manufactured by Shimadzu Corporation). The result is shown in Table 1.

TABLE 1

|  | Example 20 | Example 21 | Example 22 | Example 23 | Example 24 | Comparative Example 2 |
| --- | --- | --- | --- | --- | --- | --- |
| hardness | 3H | H | 4H | 2H | H | 6B |
| adhesion | ⊚ | ⊚ | ⊚ | ⊚ | ⊚ | X |
| solvent resistance | ⊚ | ⊚ | ⊚ | ⊚ | ⊚ | ⊚ |
| haze (%) | 0.9% | 1.2% | 1.0% | 0.8% | 0.8% | 0.5% |
| refractive index | 1.41 | 1.37 | 1.43 | 1.40 | 1.37 | 1.41 |
| reflectivity | 2.1 | 1.5 | 2.5 | 1.7 | 1.5 | 2.1 |

The antireflection film according to the present invention has a plurality of uniformly distributed nanopores. Due to the nanopores, the antireflection film has a refractive index less than 1.45, reducing the reflectivity of less than 3.0%. Accordingly, the antireflection film has a pencil hardness exceeding F, and a haze of 0.5~1.5%. Compared to conventional non-crosslink antireflection films (disclosed in Comparative Example 2), the antireflection film comprises of polymerizing colloid silica with a high crosslink density and exhibits superior mechanical strength and scratch resistance, suitable for use in display device.

While the invention has been described by way of example and in terms of preferred embodiment, it is to be understood that the invention is not limited thereto. It is therefore intended that the following claims be interpreted as covering all such alteration and modifications as fall within the true spirit and scope of the invention.

What is claimed is:

1. An antireflective coating composition, comprising, as a uniform solution in an organic solvent:
    an initiator;
    a polymerizable oxide-containing colloid, comprising condensation products derived from (i) colloid particles having a formula (I), of $Z_xO_y$, and (ii) a compound with polymerizable groups having a formula (II), of wherein
    Z is element of Group IIIB, Group IVB, or Group VB, W, Be, Ti, Zr, or Zn;
    x and y are integers equal to or more than 1;

R¹ is acryloyl group, epoxy group, or isocyanato group;
R² is alkyl group or haloalkyl group;
M is Si, Al, Ti, Zr, Sn, or Sb; and
n and m are integers equal to or more than 1,
wherein the weight ratio between (i) the colloid particles and (ii) the compound with polymerizable groups is 10:1~1:10; and
a template, wherein the weight ratio between the template and the polymerizable oxide-containing colloid is 45:55~5:95, and the template comprises a polymer non-reactive with polymerizable oxide-containing colloid.

2. The antireflective coating composition as claimed in claim 1, wherein the colloid particles represented by formula (I) comprise $WO_3$, ZnO, $SiO_2$, $Al_2O_3$, $TiO_2$, $ZrO_2$, $SnO_2$, BeO, $Sb_2O_5$, or combinations thereof.

3. The antireflective coating composition as claimed in claim 1, wherein the compound with polymerizable groups comprises glycidoxy triethoxysilane, glycidyloxypropyl triethoxy silane, or combinations thereof.

4. The antireflective coating composition as claimed in claim 1, further comprising a polymerizable monomer, wherein the weight ratio between the polymerizable monomer and the polymerizable oxide-containing colloid is 10:1 to 1:10.

5. The antireflective coating composition as claimed in claim 1, wherein the diameter of the colloid particle is 5~150 nm.

6. The antireflective coating composition as claimed in claim 1, further comprising an additive, wherein the weight ratio between the additive and the polymerizable oxide-containing colloid is 1:99~1:1, and the additive comprises planarization reagent, leveling agent, tackifier, filler, defoamer, or combinations thereof.

7. The antireflective coating composition as claimed in claim 1, wherein the polymerizable oxide-containing colloid comprises a mixture or product of a fluorine-containing polymerizable monomer and condensation products derived from (i) colloid particles with a formula (I), and (ii) a compound with polymerizable groups having a formula (II).

8. The antireflective coating composition as claimed in claim 7, wherein the fluorine-containing polymerizable monomer comprises 2,2,2-trifluoroethyl acrylate, 2,2,2 trifluoroethyl methacrylate, hexafluoroisopropyl acrylate, hexafluoroisopropyl methacrylate, 2,2,3,3,3-pentafluoropropyl acrylate, 2,2,3,3,3-pentafluoropropyl methacrylate, 2,2,3,3,4,4,4-heptafluorobutyl acrylate, 2,2,3,3,4,4,4-heptafluorobutyl methacrylate, 2,2,3,3,3-tetrafluoropropyl acrylate, 2,2,3,3-tetrafluoropropyl methacrylate, 2,2,3,4,4,4-hexafluorobutyl acrylate, 2,2,3,3,3-pentafluoropropyl methacrylate, 2,2,3,3,4,4,4-heptafluorobutyl methacrylate, 2,2,3,3-tetrafluoropropyl methacrylate, 2,2,3,4,4,4-hexafluorobutyl methacrylate, or combinations thereof.

9. A method for fabricating antireflection film, comprising:
providing a substrate with a surface;
forming a coating of an antireflective coating composition on the surface; and
curing the coating to polymerize the antireflective coating composition, thereby forming an antireflection film,
wherein the antireflective coating composition comprises, as a uniform solution in an organic solvent:
an initiator; and
a polymerizable oxide-containing colloid, comprising condensation products derived from (i) colloid particles having a formula (I), of ZxOy, and (ii) a compound with polymerizable groups having a formula (II), of $(R^1)_n$—$M(OR^2)_m$, wherein
Z is element of Group IIIB, Group IVB, or Group VB, W, Be, Ti, Zr, or Zn;
x and y are integers equal to or more than 1;
R1 is acryloyl group, epoxy group, or isocyanato group;
R2 is alkyl group or haloalkyl group;
M is Si, Al, Ti, Zr, Sn, or SB; and
n and m are integers equal to or more than 1,
wherein the weight ratio between (i) the colloid particles and (ii) the compound with polymerizable groups is 10:1~1:10; and
a template, wherein the weight ratio between the template and the polymerizable oxide-containing colloid is 45:55~5:95, and the template comprises a polymer non-reactive with polymerizable oxide-containing colloid.

10. The method as claimed in claim 9, wherein the colloid particles represented by formula (I) comprise $WO_3$, ZnO, $SiO_2$, $Al_2O_3$, $TiO_2$, $ZrO_2$, $SnO_2$, BeO, $Sb_2O_5$, or combinations thereof.

11. The method as claimed in claim 9, wherein the compound with polymerizable groups comprises glycidoxy triethoxysilane, glycidyloxypropyl triethoxy silane, or combinations thereof.

12. The method as claimed in claim 9, further comprising a polymerizable monomer, wherein the weight ratio between the polymerizable monomer and the polymerizable oxide-containing colloid is 10:1 to 1:10.

13. The method as claimed in claim 9, wherein the diameter of the colloid particle is 5~150 nm.

14. The method as claimed in claim 9, further comprising an additive, wherein the weight ratio between the additive and the polymerizable oxide-containing colloid is 1:99~1:1, and the additive comprises planarization reagent, leveling agent, tackifier, filler, defoamer, or combinations thereof.

15. The method as claimed in claim 9, wherein the polymerizable oxide-containing colloid comprises a mixture or product of a fluorine-containing polymerizable monomer and condensation products derived from (i) colloid particles with a formula (I), and (ii) a compound with polymerizable groups having a formula (II).

16. The method as claimed in claim 9, wherein the coating is formed by spin coating, dip coating, roll coating, printing, embossing, stamping, or spray coating.

17. A method for fabricating antireflection film, comprising:
providing a substrate with a surface;
forming a coating of an antireflective coating composition on the surface, wherein the composition comprises, as a uniform solution in a first organic solvent:
an initiator in an amount of 1 to 10 parts by weight;
a template in an amount of 5 to 55 parts by weight; and
a polymerizable oxide-containing colloid in an amount of 45 to 95 parts by weight, based on 100 parts by weight of the polymerizable oxide-containing colloid and the template, wherein the polymerizable oxide-containing colloid comprises condensation products derived from (i) colloid particles having a formula (I), of ZxOy, and (ii) a compound with polymerizable groups having a formula (II), of $(R^1)_n$—$M(OR^2)_m$, wherein
Z is element of Group IIIB, Group IVB, or Group VB, W, Be, Ti, Zr, or Zn;
x and y are integers equal to or more than 1;
R1 is acryloyl group, epoxy group, or isocyanato group;
R2 is alkyl group or haloalkyl group;
M is Si, Al, Ti, Zr, Sn, or SB; and n and m are integers equal to or more than 1, and the weight ratio between (i) the colloid particles and (ii) the compound with polymerizable groups is 10:1~1:10, and the template comprises a polymer non-reactive with polymerizable oxide-containing colloid;

curing the coating to polymerize the antireflective coating composition to form a dry film; and dissolving the template from the dry film by a second organic solvent to remain anantireflection film with nanopores.

18. The method as claimed in claim 17, wherein the colloid particles represented by formula (I) comprises $WO_3$, ZnO, $SiO_2$, $Al_2O_3$, $TiO_2$, $ZrO_2$, $SnO_2$, BeO, $Sb_2O_5$, or combinations thereof.

19. The method as claimed in claim 17, wherein the compound with polymerizable groups comprises glycidoxy triethoxysilane, glycidyloxypropyl triethoxy silane, or combinations thereof.

20. The method as claimed in claim 17, further comprising a polymerizable monomer, wherein the weight ratio between the polymerizable monomer and the polymerizable oxide-containing colloid is 10:1 to 1:10.

21. The method as claimed in claim 17, wherein the diameter of the colloid particle is 5~150 nm.

22. The method as claimed in claim 17, further comprising an additive, wherein the weight ratio between the additive and the polymerizable oxide-containing colloid is 1:99~1:1, and the additive comprises planarization reagent, leveling agent, tackifier, filler, defoamer, or combinations thereof.

23. The method as claimed in claim 17, wherein the polymerizable oxide-containing colloid comprises a mixture or product of a fluorine-containing polymerizable monomer and condensation products derived from (i) colloid particles with a formula (I), and (ii) a compound with polymerizable groups having a formula (II).

24. The method as claimed in claim 17, wherein the coating is formed by spin coating, dip coating, roll coating, printing, embossing, stamping, or spray coating.

25. The method as claimed in claim 17, wherein the template comprises non-reactive organic compound, non-reactive oligomer, non-reactive polymer, or combinations thereof.

26. An antireflection film produced by the method of claim 9.

27. An antireflection film produced by the method of claim 17.

* * * * *